United States Patent [19]

Burns et al.

[11] Patent Number: 4,737,005
[45] Date of Patent: Apr. 12, 1988

[54] METHOD FOR ELIMINATING BIREFRINGENCE IN A FIBER OPTIC COUPLER AND A COUPLER POLARIZATION CORRECTOR

[75] Inventors: William K. Burns, Alexandria; Carl A. Villarruel, Burke, both of Va.; Chin-Lin Chen, W. Lafayette, Ind.

[73] Assignee: The United States of America as represented by the Secretary of the Navy, Washington, D.C.

[21] Appl. No.: 450,693

[22] Filed: Dec. 17, 1982

[51] Int. Cl.$^4$ ............................ G02B 6/26; G02B 5/30
[52] U.S. Cl. ............................. 350/96.15; 350/96.10; 350/96.29; 350/96.30; 350/320; 350/370
[58] Field of Search ............... 350/96.10, 96.15, 96.16, 350/96.20, 96.29, 96.30, 96.33, 320, 370; 250/227

[56] References Cited

U.S. PATENT DOCUMENTS

| | | | |
|---|---|---|---|
| 3,756,690 | 9/1973 | Borrelli et al. | 350/96.29 |
| 3,914,764 | 10/1975 | Ohm | 343/100 PE |
| 4,153,328 | 5/1979 | Wang | 350/96.11 |
| 4,239,329 | 12/1980 | Matsumoto | 350/96.15 |
| 4,298,245 | 11/1981 | Aulich et al. | 350/96.29 |
| 4,310,813 | 1/1982 | Yuuki et al. | 333/117 |
| 4,341,442 | 7/1982 | Johnson | 350/96.15 |
| 4,372,644 | 2/1983 | Unger | 350/96.15 |
| 4,603,941 | 8/1986 | Fujii et al. | 350/96.15 |
| 4,606,605 | 8/1986 | Ashkin et al. | 350/96.30 X |
| 4,632,513 | 12/1986 | Stowe et al. | 350/320 |
| 4,673,244 | 6/1987 | Miles | 350/96.20 |

FOREIGN PATENT DOCUMENTS

| | | | |
|---|---|---|---|
| 55-88003 | 3/1980 | Japan | 350/96.15 |
| 57-64704 | 4/1982 | Japan | 350/96.29 |

OTHER PUBLICATIONS

Barlow et al., "Birefringence and Polarisation Mode Dispersion", Elect. Lett., 10/81, vol. 17, No. 20, pp. 725-726.
Smith, "Birefringence Induced by Bends . . . ", Applied Optics, vol. 19, No. 15, 8/80, pp. 2606-2611.
Ulrich et al., "Polarization of Twisted . . . Fibers", Applied Optics, vol. 18, No. 13, 7/79, pp. 2241-2251.
Jones et al., "A New Calculus . . . of Optical Systems", J. of Opt. Sci. Amer., vol. 31, 7/41, pp. 493-499.
Villarruel et al., "Birefringence Correction . . . Couplers", Optics Lett., vol. 7, No. 12, 12/82, pp. 626-628.
Johnson, "Single-Mode Fiber . . . Fibers", Optics Lett., vol. 5, No. 4, 4/80, pp. 142-144.
Day et al., "Faraday Rotation in . . . Coils", Conf. on Optical Fiber Sensors Publ., 5/82, pp. 4/1-4/4.
Ulrich et al., "Single Mode Fiber . . . Rotator", Applied Optics, vol. 18, No. 11, 6/79, pp. 1857-1861.
Sheem et al., "Polarization Effects . . . Sensors", Appl. Phys. Lett., vol. 35, No. 12, 12/79, pp. 914-917.
Day et al., "Faraday Rotation in . . . Sensors", Optics Lett., vol. 7, No. 5, 5/82, pp. 238-240.
Yen et al., "Birefringent Optical . . . Fiber", Optics Lett., vol. 6, No. 6, 6/81, pp. 278-280.
Kumar et al., "Birefringence of Optical Fiber . . . Groove", Optics Lett., vol. 6, No. 12, 12/81, pp. 644-648.

*Primary Examiner*—William L. Sikes
*Assistant Examiner*—Brian M. Healy
*Attorney, Agent, or Firm*—Thomas E. McDonnell; Ansel M. Schwartz; Charles S. Guenzer

[57] ABSTRACT

A method for correcting birefringence in a fiber optic coupler comprising measuring the intrinsic birefringent retardation, fast axis orientation and rotation of separate paths through the coupler and adding lumped birefringent elements to the ports of the coupler in a fashion to compensate for the intrinsic birefringence.

14 Claims, 3 Drawing Sheets

METHOD FOR ELIMINATING BIREFRINGENCE IN A FIBER OPTIC COUPLER AND A COUPLER POLARIZATION CORRECTOR

BACKGROUND OF THE INVENTION

1. Field of the Invention

The invention pertains generally to fiber optic couplers and in particular to the correction of the birefringence of such couplers.

2. Description of the Prior Art

The description of the prior art is divided into four parts: (1) definitions of fiber optic couplers and two special types of couplers, namely combiners and splitters; (2) a description of the birefringence or change in polarization introduced by most single mode couplers; (3) a presentation of the Jones calculus for two-part birefringent systems; and (4) a discussion of the usefulness of the prior art for eliminating birefringence in single mode optical couplers.

Single mode optical fibers are finding increasing application in interferometric sensors such as acoustic, magnetic, and rotational sensors in data bus distribution systems for communications applications. Such uses often require single mode fiber couplers which couple together the signals on two or more fibers. A simple type of single mode directional coupler described by Bergh et al in Electronics Letters, volume 16, pages 260–261, 1980 involves forcing together two parallel fibers. Light modes propagating on either of the fibers will couple in a controlled fashion onto the other fiber and propagate in the parallel direction on that fiber. Such a coupler is most generally a 2×2 coupler since it has two input ports and two output ports. A 2×2 coupler can also be used as a 1×2 coupler or splitter which has a single input port but two output ports through which the signal propagates. Alternatively the 2×2 coupler can be used as a 1×2 combiner which has two input ports and a single output port through which propagates a signal which is a combination of the input signals. More general combiners can be built with more input or output ports. In particular, it is possible to build 1×N splitters and N×1 combiners. In fact, couplers are usually reciprocal devices, i.e. they can operate backwards in the respect that if a given combination of signals on the input ports produces a given output signal at the output port, then if that given output signal is actively applied to the output port (now used as an input), the original combination of input signals appears at the input ports (now used as outputs). As a result a reciprocal combiner can be used as a splitter and vice versa.

Single mode fiber couplers of the type described by Bergh are being fabricated by a variety of methods, such as etching, polishing, and fusion and can be encapsulated in liquid, epoxy, sol-gel glass or left unencapsulated. Often the fiber leads are fixed with epoxy to facilitate mounting in a container after the coupler is fabricated. Although little data has been published, it has become evident that these types of couplers typically do not preserve optical polarization through the coupler. Instead linearly polarized inputs are often transformed to highly elliptical states of polarization upon exiting the coupler. Analagous transformations occur for circularly polarized input. Since these couplers are often used in series and the coupling fraction typically varies with the input polarization state, these effects lead to reduced sensitivity and polarization noise in interferometers and to non-optimum coupling fractions in fiber data buses. The mechanism for polarization transformation within a fiber coupler appears to be due to the presence of linear and circular birefringence induced in the fibers during the process of coupler fabrication, and also to the intrinsic birefringence of the fiber introduced during the fiber's manufacture. The process of how these birefringences alter the state of optical polarization of the light passing through a fiber has been explained in detail by Ulrich and Simon in Applied Optics, volume 18, pages 2241–2251, 1979. This understanding of the mechanisms will probably enable the future fabrication of single mode couplers with less birefringence. To what degree this can be accomplished in the future is uncertain and it is unknown if such fabrication techniques will impose additional constraints upon coupler design. It is possible that a coupler can be made that is free of birefringence for one set of conditions but becomes birefringent with further aging or a change of environmental conditions.

In a different approach, Hurwitz and Jones have shown in the Journal of the Optical Society of America, volume 31, pages 493–499, 1941 that for monochromatic input a two port system of arbitrary birefringence can be represented by two lumped biefringent elements: a linear birefringence elements (retarder) with retardation R and fast axis orientation $\phi$, and a circular birefringent element (rotator) with rotation $\Omega$.

FIG. 1a is a pictorial representation of a two-port lossless system 10 which may be simply an optical fiber. The system 10 has an input port 12 and an output port 14. Monochromatic signal inputs to a system 10 which is a single mode system can be represented by the input vector $E_{in}$ while the output vector is $E_{out}$. The basis of these two vectors are orthogonal light modes, here the two linear polarizations. Hurwitz and Jones showed that the system 10 can be represented by the lumped birefringent elements shown in the equivalent representation of FIG. 1b. The general birefringent system 10 can be replaced by a retarder 16 having retardation R and a fast-axis orientation $\phi$ for that retardation followed by a rotator 18 having rotation $\Omega$. Note that the order of the elements 16 and 18 is important. The elements 16 and 18 may be reversed but the values of their parameters will in general be different. According to the Jones calculus described by Jones and Hurwitz the two elements 16 and 18 may be represented by the two matrices $$S(-\Omega) = \begin{pmatrix} \cos \Omega & -\sin \Omega \\ \sin \Omega & \cos \Omega \end{pmatrix} \tag{1}$$

and $$R(R) = \begin{pmatrix} e^{iR/2} & 0 \\ 0 & e^{-iR/2} \end{pmatrix} \tag{2}$$

The transformation represented in Eqn. 1 is a rotation of the axes by $-\Omega$ which is equivalent to a rotation of the optical field by $+\Omega$. Jones and Hurwitz then showed that the two-part system of FIG. 1b is equivalent to the mathematical transformation of $$\underline{E}_{out} = \underline{S}(-\Omega)\underline{S}(-\phi) \tag{3}$$

-continued $$\underline{R}(R)\underline{S}(\phi)\underline{E}$$

This equation is a vector transformation involving multiple matrix multiplications.

The usefulness of the lumped birefringent elements 16 and 18 for multi-port (greater than two) systems was not disclosed by Jones and Hurwitz. Their derivation depended upon a single optical path, a model incompatible with dividers and combiners. Indeed it has been observed theoretically that when the coupling between optical fibers is anisotropic, i.e. depends on the state of polarization, then the model of lumped birefringent elements cannot represent such a path.

Ulrich has described in Applied Physics Letters, volume 35, pages 840–842, a polarization stabilization scheme for a single optical fiber. The fiber was understood to be undergoing time-varying environmental changes of its birefringence. Therefore a complicated feed-back system was used to correct the fibers birefringence in real-time. The system furthermore could only work with a single polarization mode on the single mode fiber.

Summary

Therefore it is an object of this invention to provide a fiber optic coupler that preserves polarization.

It is a further object of this invention to provide a method for correcting the birefringence of a birefringent fiber optic coupler.

It is a still further object of this invention to provide a method for correcting the birefringence of a fiber optic coupler after the coupler has been fabricated or put in service.

It is yet a further object of this invention to provide a fiber optic polarization corrector useful for single mode fibers carrying two orthogonally polarized light modes.

The invention provides a method of correcting the birefringence of a fiber optic coupler by treating any path through the coupler as a two port system. The intrinsic birefringent parameters of that path are measured and additional lumped or distributed birefringent elements, such as retarders and rotators, are added to the input or output port of the coupler to compensate the intrinsic birefringence.

BRIEF DESCRIPTION OF THE DRAWINGS

A more complete appreciation of the invention and many to the attendant advantages thereof will be readily obtained as the same better understood by reference to the following detailed description when considered in connection with the accompanying drawings, wherein:

FIG. 1b is a schematic representation of lumped element equivalent of FIG. 1a.

DETAILED DESCRIPTION OF THE PREFERRED EMBODIMENTS

Figure 1A:
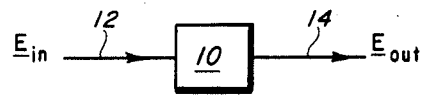
FIG. 1a is a schematic representation of a two-port fiber optical system.
Figure 1B:

The co-inventors here have observed that many real fiber optic couplers show output states which are very nearly linearly polarized for linearly polarized inputs of appropriate azimuth. Such behavior is characteristic of the two-port system shown in FIGS. 1a and 1b. Furthermore, recent theoretical analysis of many idealized birefringent couplers have shown that the idealized coupling between fibers is isotropic with respect to the orientation of polarization so that the two-port model of Jones and Hurwitz would seem to be useful even though it is not strictly applicable to a multi-port system. Based on this analysis, it is expected that effects which lead to anisotropic polarization coupling and the subsequent breakdown of the two-port model will be second order and thus relatively small. The validity of this assumption will be shown by the experimental demonstration of this invention.

Figure 2:
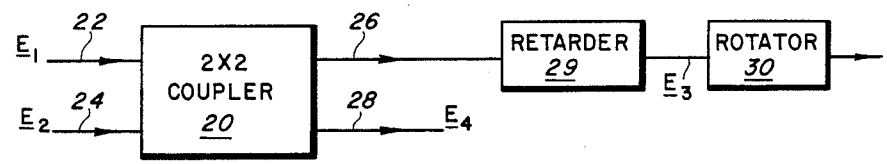
FIG. 2 is a schematic representation of a 2×2 birefringent fiber optic coupler.

FIG. 2 is a schematic representation of a 2×2 fiber optic coupler 20 with two input ports 22 and 24 and two output ports 26 and 28. The underlying assumption of the invention is that any path through the coupler 20 to a good approximation behaves as the two-port system shown in FIGS. 1a and 1b. This path is this well characterized by its own retardation and rotation. For instance, path 1-3, linking $E_1$ and $E_3$ through ports 22 and 26, will be characterized by $R_{13}$ at a fast axis angle $\phi_{13}$. There is a further parameter associated with each path, the attenuation. If the path is isotropic, then the attenuation will not depend on the polarization of the input light. Because this invention does not concern the attenuation factor, it will henceforward be disregarded. The other paths 1-4, 2-3, and 2-4 will be characterized by similar birefringent parameters. These birefringent parameters can be experimentally determined in a straightforward procedure described by Smith in Applied Optics, volume 19, pages 2606–2611, 1980.

The intrinsic birefringence retardation associated with a particular path, here the 1-3 path, can be corrected by adding appropriate birefringent elements to that path. For example, a retarder 29 can be added to the output port 26 that has a birefringent retardation $R_{13}$ with fast and slow axes interchanged with those of the intrinsic birefringent retardation of the 1-3 path. Then the net linear birefringence of the 1-3 path will be zero. The transformation of the light mode from E to $E_R$ associated with the added retarder 29 is given by:

$$E_R = \underline{S}(-\phi_{13} - \Omega_{13} - 90°)\underline{R}(R_{13}) \quad (4)$$

$$\underline{S}(\phi_{13} + \Omega_{13} + 90°)\underline{E}.$$

It can show that the transformation associated with both the intrinsic and the added linear birefringence is eqaul to a rotation, i.e.

$$\underline{S}(-\phi_{13} - \Omega_{13} - 90°)\underline{R}(R_{13}) \quad (5)$$

$$\underline{S}(\phi_{13} + \Omega_{13} - 90°)\underline{S}(-\Omega_{13})$$

$$\underline{S}(-\phi_{13})\underline{R}(R_{13})\underline{S}(\phi_{13}) = \underline{S}(-\Omega_{13}).$$

Thus a set of orthogonal light modes passing sequentally through the coupler 20 and the added retarder 29 will be transformed as $$E_3 = S(-\Omega_{13})E_1. \quad (6)$$

As a result the corrected coupler will only rotate the light modes by $\Omega_{13}$.

The resultant rotation shown in Eqn. 6 can additionally be corrected by adding a rotator 30 to the output port of the retarder that causes a rotation $-\Omega_{13}$. The use of both linear and circular birefringent elements 29 and 30 allows the coupler to be corrected for any birefringence.

Retarders and rotators for use with single mode fibers are well known in the art. Linear birefringence can be introduced by squeezing a bare or jacketed fiber along an azimuthal axis. Due to the negative electro-optical stress constants in silica fibers, fiber compression creates a fast axis along the compression axis. Circular birefringence is introduced by applying additional twist to the fiber. More details may be found in the articles by Ulrich and Simon in Applied Optics, Volume 18, pages 2241-2251, 1979 and by Ulrich in Applied Physics Letters, volume 35, pages 840-842, 1979. Although this description refers to additional birefringent elements being added to an optical fiber, it is to be appreciated that such elements may consist of applying twist or compression to the optical fibers themselves, resulting in added distributed birefringence. By such methods additional bulk optical elements are avoided in the optical paths.

Rather than applying compression along a given azimuthal angle, it is alternatively possible to use two compressors set at different angles, preferably at right angles to each other. Then varying the pressure of these two compressors will produce the same relative retardation as a single compressor at a variable angle. It is to be further appreciated that the retardation needs only to be that of one light mode relative to the other so that positive or negative retardation applied to both modes is not important. Thus one mode will be considered retarded even if in fact the other mode is advanced in phase. Furthermore since there is an ambiguity of multiples of $2\pi$ in phase, the relative retardation of one mode by $\phi$ can be accomplished equally well by retarding the other mode by $2\pi - \phi$.

It should be again noted that the couplers, retarders, and rotators are connected together with single mode optical fibers. Indeed the fibers are usually continuous through these elements but are modified as they pass through the elements in fashions previously discussed.

Figure 3:
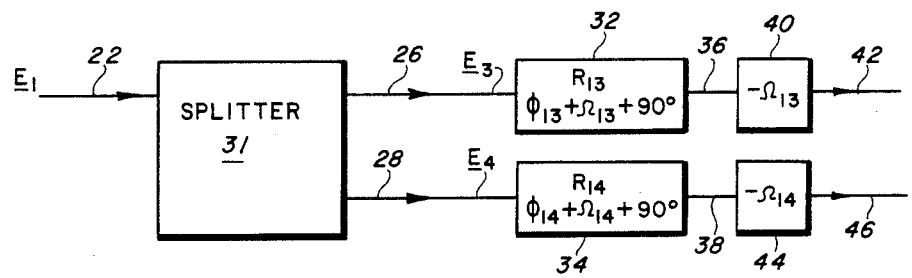
FIG. 3 is a schematic representation of one embodiment of the invention applied to a 1×2 fiber optic splitter.

The 2×2 coupler of FIG. 2 can be used as a 1×2 splitter 31 shown in FIG. 3 which uses only a single input port 22. The output ports 26 and 28 are linked by paths 1-3 and 1-4 respectively to the input port 22. The birefringence of the 1-2 path in the splitter 31 is characterized by an intrinsic retardation $R_{13}$ at fast axis angle $\phi_{13}$ and a rotation $\Omega_{13}$. Similar parameters $R_{14}$, $\phi_{14}$, and $\Omega_{14}$ apply to the 1-4 path. A linear birefringent element 32 is placed at the output port 26 that impresses a retardation $R_{13}$ at a fast axis that is at a right angle to $\phi_{13} + \Omega_{13}$. Similarly a linear birefringent element 34 has retardation $R_{14}$. As a result the retarder output line 36 has a linearly polarized light mode rotated $\phi_{13}$ from a linearly polarized light mode at the coupler input port 22. Likewise the retarder output line 38 is linearly polarized at $\Omega_{14}$ to the input light mode.

The addition of a circularly birefringent element 40 to the retarder output line 36 that rotates the polarization by $-\Omega_{13}$ will provide a light signal at the rotator output port 42 that has the same polarization as the light signal the input port 22. Similarly the addition of a circularly birefringent element 44 of rotation $-\Omega_{14}$ will provide a light output at the rotator output port 46 with the same polarizarion as that at the input port 22.

Since the splitter 31 has been completely corrected for birefringence, circularly polarized light at the input port 22 will produce circularly polarized light at the rotator output lines 42 and 46. Furthermore the light appearing on the retarder output lines 36 and 38 will also be circularly polarized because the uncorrected rotation at those points will not affect the state of polarization. However, there will be a differential phase shift between a left and a right circularly polarized light mode on the retarder output lines 36 and 38.

The operation of the retarder 32 and rotator 40 can be visualized by appreciating that the light appearing on the splitter output port 26 has a fast axis oriented at $\phi_{13} + \Omega_{13}$. Compression at a right angle to this axis can compensate for the fast axis introduced by the birefringence of the splitter 31. However, the light appearing at the retarded output port 36 still is rotated $\Omega_{13}$ from the light at the splitter input 22. This rotation is then compensated by the rotator 40. Similar visualization applies to the retarder 34 and rotator 44 associated with the other splitter output port 28.

Figure 4:
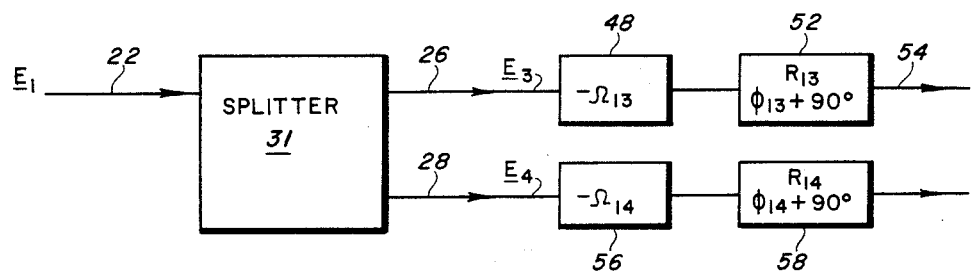
FIG. 4 is a schematic representation of another embodiment of the invention applied to a 1×2 fiber optic splitter.

From this visualization, it can be seen that the order of the retarders 32 and 34 and rotators 40 and 44 can be reversed from that shown in FIG. 3 to the configuration shown in FIG. 4. The light on the splitter output port 26 with rotation $\Omega_{13}$ and a fast axis at $\phi_{13} + \Omega_{13}$ is rotated $-\Omega_{13}$ by a rotator 48. The light on the rotator output port 50 then has no rotation but has a fast axis at $\phi_{13}$. The retarder 52 set at 90° to $\phi_{13}$ can then apply a retardation $R_{13}$. The resultant light on the retarder output port 54 will thus have the same polarization as light at the splitter input port 22. Similar considerations apply to the rotator 56 and retarder 58 associated with the other splitter output port 28.

As noted previously, a 2×2 coupler can be used either a 1×2 splitter or a 2×1 combiner. Many such couplers are reciprocal in the sense explained in the background. Thus 1×2 splitter 30 of FIG. 3 can also be used as a 2×1 combiner. The two light signals are applied to the splitter output ports 26 and 28. A combined light signal appears at the splitter input port 22. However, the intrinsic birefringence of the splitter 30 will cause the light modes to combine in a fashion such that polarization is not maintained. This birefringence of the combiner can be corrected in the same manner as the splitter birefringences. Indeed if the retarders 32 and 34 and rotators 40 and 46 are themselves reciprocal, then the system shown in FIG. 3 will provide a non-birefringent combiner as well as a non-birefringent splitter. The two light modes are applied to the rotator output ports 42 and 46 and the light appearing at the splitter input port 22 will have maintained the polarization of the input light modes. Rotators relying on twist and retarders relying on compression of silica fibers are reciprocal. However, rotators relying upon the Faraday effect by the application of a magnetic field are not reciprocal but produce the opposite rotation in opposing directions when viewed from one side.

Figure 5:
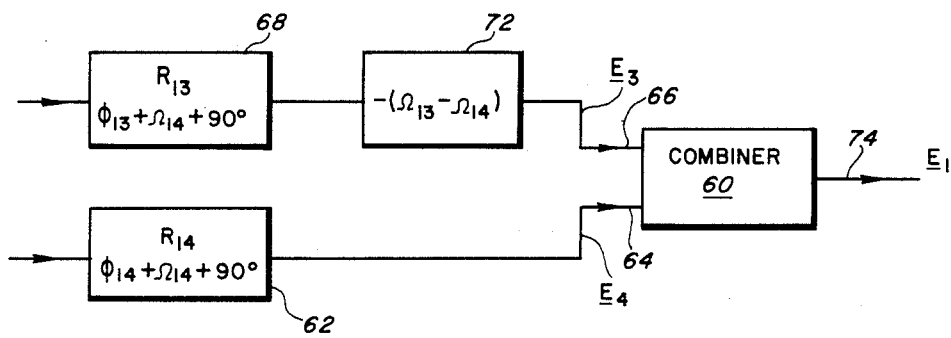
FIG. 5 is a schematic representation of yet another embodiment of the invention applied to a 2×1 fiber optic combiner.

Many variations upon the correction scheme are possible. One such variation shown in FIG. 5 is particularly useful when the rotations in the two paths are large but closely matched to each other. The birefringent parameters of the combiner 60 are measured with the combiner 60 used as a splitter. A retarder 62 is added to one of the combiner input ports 64 with the retardation $R_{14}$ and fast axis orientation $\phi_{14}+\Omega_{14}+90°$ as was done for the splitter of FIG. 3. On the other combiner input port 66 another retarder 68 is added with retardation $R_{13}$ and a fast axis orientation of $\phi_{13}+\Omega_{14}+90°$, i.e. the rotation of the other port 64 is used. Then between this retarder 68 and the combiner input port 66 is placed a rotator 72 which rotates by an angle $-(\Omega_{13}-\Omega_{14})$. The light at the combiner output port 74 will have correctly combined the two input modes but will itself be rotated $\Omega_{14}$. This rotation could additionally be corrected if desired.

Figure 6A:
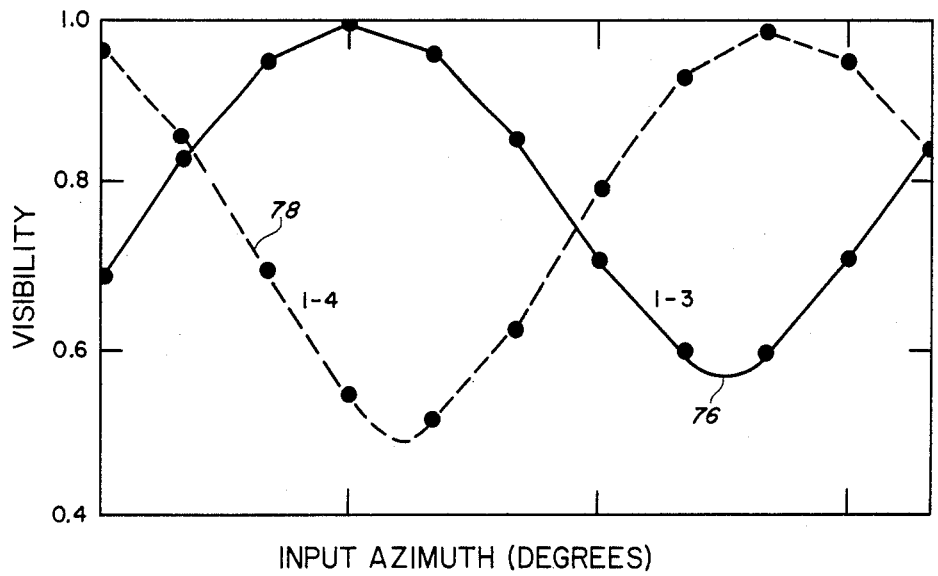
FIG. 6a is a graph displaying the measured visibility of two paths of an uncorrected 2×1 fiber optic splitter as a function of the azimuth of the linearly polarized input light. Visibility is a measure of the birefringence introduced by the coupler.
Figure 6B:
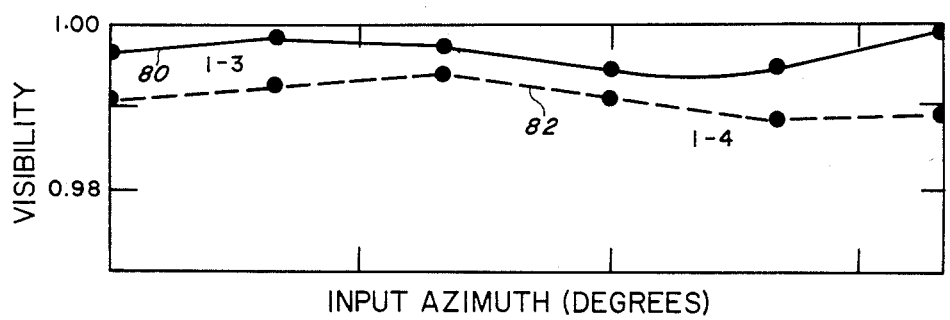
FIG. 6b is a graph displaying the measured visibility of the same two paths shown in FIG. 6a but using the correction scheme of FIG. 4.
Figure 6C:
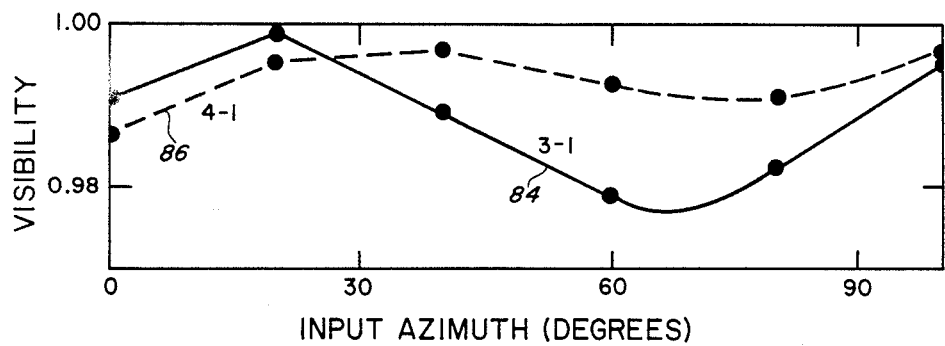
FIG. 6c is a graph displaying the visibility of the corrected splitter as in FIG. 6a but operated in the reverse direction as a combiner.
Figure 7:
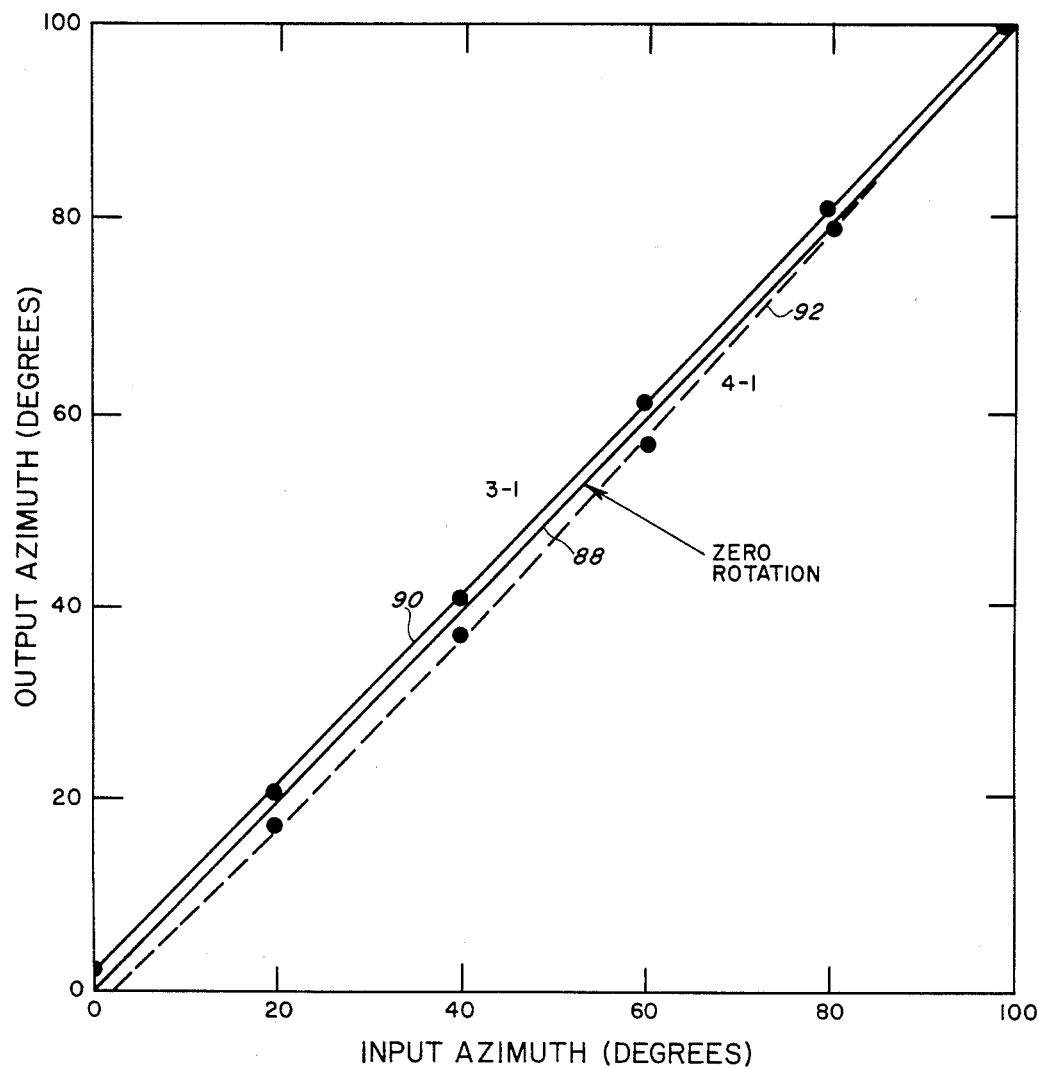
FIG. 7 is a graph displaying the azimuth of the linearly polarized output as a function of the azimuth of the linearly polarized input for the corrected 2×1 combiner of FIG. 6c.

This invention has been implemented and its utility was experimentally verified. The visibility of the output of an uncorrected splitter was measured for a linearly polarized input. These values are plotted in FIG. 6a for the two paths as a function of the azimuth of input linear polarization. Visibility is a measure of polarization ellipticity with a value of one for linearly polarized light and a value of zero for circularly polarized light. The visibility for path 1-3 is given by curve 76 and for path 1-4 by curve 78. It is seen that the visibility for an uncorrected coupler varies with input azimuth and has values dropping to less than 0.5. Then the birefringence was corrected by applying twist and compression to the output fiber leads in the configuration of FIG. 4. Then the visibility was remeasured along the extended paths. These visibilities are plotted in FIG. 6b for path 1-3 in curve 80 and path 1-4 in curve 82. It is seen that the azimuthal variation of the visibility is much reduced and its value is held above 0.98. Then the visibility was measured in the opposite direction, i.e. the coupler was used as a combiner rather than a splitter. These values of visibility are plotted in FIG. 6c for path 3-1 in curve 84 and path 4-1 in curve 86. It is seen that relative to FIG. 6a the variation in visibility is greatly reduced and the visibility is maintained to within 2% of unity. Therefore the coupler is nearly reciprocal and the same correction can be applied to this coupler regardless of the direction in which it is operated. Finally, the linear output azimuth of the output for the combiner was measured as a function of the azimuth of the input light. These values are plotted in FIG. 7. Straight line 88 indicates the locus for zero rotation. The output azimuth for path 3-1 is given by curve 90 and the output azimuth for path 4-1 by curve 92. No more than a 3° rotation was observed.

It is to be appreciated that the invention is not restricted to 1×2 splitters, 2×1 combiners, or 2×2 couplers. Couplers have been made with more than two inputs or more than two outputs. This invention can correct the birefringence associated with any of the paths through the coupler. Furthermore, it is possible to use the invention to completely correct the birefringence of a 1×N splitter or a N×1 combiner by applying separate corrections to each of the ports on the multi-port side of the coupler after measuring the intrinsic birefringence of the N-paths.

What has been described is a method for correcting the birefringence of a fiber optic coupler by adding lumped or distributed birefringent elements to the ports of the coupler in amounts and with orientations to compensate for the measured birefringence of the path to which the elements are added. The apparatus necessary for a birefringence-free coupler has also been described. The corrections can be made by applying twist or compression directly to the optical fiber.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method for correcting birefringence in a fiber optic coupler which couples at least 2 optical fibers wherein each optical path through said coupler has rotation, retardation, and a fast axis orientation, comprising:
   measuring the retardation, the fast axis orientation, and the rotation of at least one optical path through said coupler, such that every optical path formed by every optical fiber coupled by said coupler is treated as independent of any other optical path formed by any other optical fiber coupled by said coupler, and determining the negative of the measured rotation; and
   applying to said path additional retardation to compensate for the measured retardation.

2. A method for correcting birefringence in a fiber optic coupler, as recited in claim 1, wherein said additional retardation is applied at a point in said optical path and has a fast axis set at 90° from the fast axis at that point.

3. A method for correcting birefringence in a fiber optic coupler, as recited in claim 2, wherein the amount of additional retardation that is applied substantially equals the measured retardation.

4. A method for correcting birefringence in a fiber optic coupler, as recited in claim 2, further comprising applying an additional rotation to said path.

5. A method for correcting birefringence in a fiber optic coupler, as recited in claim 4, wherein the amount of additional rotation that is applied at a point in the optical path substantially equals the negative of the measured rotation at that point.

6. A method for correcting birefringence in a fiber optic coupler, as recited in claim 5, wherein retardation is added to two or more paths of said fiber optic coupler.

7. A method for correcting birefringence in a fiber optic coupler having N-ports on one side of said coupler, N greater than or equal to and 1 port on the other side, comprising:
   measuring the retardation, the fast axis orientation, and the rotation of all N-paths through said coupler; and applying to each said port of the N ports additional retardation at a point in the optical path of said port substantially equal to the measured retardation and with the orientation of the fast axis of said applied retardation being perpendicular to the orientation of the fast axis at that point.

8. A method for correcting birefringence in a fiber optic coupler, as recited in claim 7, further comprising applying rotation to at least N−1 ports of the N ports to compensate for the measured rotations.

9. A method for correcting birefringence in a fiber optic coupler as recited in claim 8, wherein said optical fiber coupler comprises silica optical fiber and wherein said additional retardation is applied by compressing said silica optical fiber perpendicular to said measured fast axis and said additional rotation is applied by twisting said silica optical fiber.

10. A method for correcting birefringence in a 1×2 fiber optic splitter having an input port and output ports, and wherein each optical path through said splitter has rotation, retardation, and a fast axis orientation comprising:
measuring the retardation, the fast axis oientation, and the rotation of both paths through said splitter;
applying a rotation to each of the paths on the output side of said splitter, said rotation being equal and opposite to the measured rotation in said path; and
applying a retardation in each of the paths on the output side of said splitter, said retardation and being applied with its fast axis perpendicular to the measured fast axis.

11. A polarization maintaining fiber optic coupler, comprising:
a fiber optic coupler having more than two ports connected by more than one path, each of said paths having a retardation and a rotation;
optical fibers joined to the ports of said coupler; and
birefringent retarders attached at a location of attachment to at least one of said fibers having a fast axis perpendicular to the fast axis of the path at the location of attachment and a retardation equal to the retardation of the path.

12. A polarization maintaining fiber optic coupler, as recited in claim 11, further comprising rotators attached to at least one of said fibers having a rotation equal in magnitude and opposite in sign to the rotation of a path passing through said fiber.

13. A polarization maintaining fiber optic 1×2 splitter, as recited in claim 12, wherein the birefringent retarders and rotators are attached to each of the output ports of said splitter.

14. A polarization maintaining fiber optic 2×1 combiner, as recited in claim 12, wherein the birefringent retarders and rotators are attached to each of the input ports of said combiner.

* * * * *